(12) United States Patent
Bowen et al.

(10) Patent No.: US 8,604,903 B2
(45) Date of Patent: Dec. 10, 2013

(54) ELECTRONIC LOCKING SYSTEM WITH WIRELESS UPDATE AND CASCADE LOCK CONTROL

(75) Inventors: Rick Bowen, St. Chal, MO (US); Mark Bowen, Fayetteville, GA (US)

(73) Assignee: Synpatic Wireless, LLC, O'Fallon, MO (US)

( * ) Notice: Subject to any disclaimer, the term of this patent is extended or adjusted under 35 U.S.C. 154(b) by 419 days.

(21) Appl. No.: 13/009,635

(22) Filed: Jan. 19, 2011

(65) Prior Publication Data

US 2011/0254659 A1 Oct. 20, 2011

Related U.S. Application Data

(60) Provisional application No. 61/296,422, filed on Jan. 19, 2010.

(51) Int. Cl.
*G06F 7/04* (2006.01)

(52) U.S. Cl.
USPC ............ 340/5.6; 340/5.7; 340/5.28; 340/528; 340/5.5; 340/5.27; 340/5.73

(58) Field of Classification Search
USPC .......... 340/5.6, 5.28, 528, 5.5, 5.27, 5.73, 5.7
See application file for complete search history.

(56) References Cited

U.S. PATENT DOCUMENTS

| | | | |
|---|---|---|---|
| 5,936,544 A | 8/1999 | Gonzales et al. | |
| 7,006,672 B2* | 2/2006 | Sato et al. | 382/118 |
| 7,598,842 B2* | 10/2009 | Landram et al. | 340/5.73 |
| 2004/0174247 A1 | 9/2004 | Rodenbeck et al. | |

OTHER PUBLICATIONS

"Sleepy Nodes and Sleepy Meshes—Ultra-low-power Mesh Routing," Synapse, www.synapse-wireless.com, 2008, 7 pages.
"SNAP based Wireless Mesh Networks," Synapse Wireless, www.synapse-wireless.com, 2008, 7 pages.

* cited by examiner

*Primary Examiner* — Phung Nguyen
*Assistant Examiner* — John Bamert
(74) *Attorney, Agent, or Firm* — Lewis, Rice & Fingersh, L.C.

(57) ABSTRACT

A wireless access control system comprising a central access control system connected through a wireless network to a remote access control system comprised of a plurality of localized remote access controllers (locking mechanisms). The plurality of remote access controllers will generally be used to lock parts of a facility, whether physical facilities, parts thereof or mobile components within the facilities, and will allow for a supervisory function to determine which users of the system are allowed to access which resources within a facility. Also disclosed herein is an interlinked cascade lock system coupled to a central access control system that is comprised of at least two levels of security.

16 Claims, 6 Drawing Sheets

ELECTRONIC LOCKING SYSTEM WITH WIRELESS UPDATE AND CASCADE LOCK CONTROL

CROSS REFERENCE TO RELATED APPLICATION(S)

This application claims the benefit of U.S. Provisional Patent Application Ser. No. 61/296,422, filed Jan. 19, 2010, the entire disclosure of which is incorporated by reference herein.

BACKGROUND OF THE INVENTION

1. Field of the Invention

This disclosure relates to the field of electronic locks. In particular, to wireless access control systems and methods which permit wireless communications between a plurality of self-authenticating remote access controllers and a central access system in real-time. Further, the disclosure relates to wireless access control systems that have the ability to control an interlinked lock cascade (secondary locks residing on the same structure).

2. Description of Related Art

The need to have secured access to certain parts of facilities, such as, but not limited to, hospitals, has resulted in a long narrative history of access control devices and systems. In the beginning, simple mechanical locks (lock and key holes) were used to limit access to restricted areas. In the mechanical lock system, tangible keys were provided to authorized users. If locks were changed, new keys were provided to all authorized users. This approach was both costly and confusing. Without a way to identify the individual lock (an identifying mark or embossed code) it was challenging to identify the appropriate key for a specific lock. Since many authorized users would carry large numbers of mechanical keys, the process of finding the correct key for a specific lock could be a cumbersome one. The process was also subject to fraud since mechanical keys could easily be duplicated without detection. Thus, when a key was lost or misplaced, individual locks would often have to be replaced with new locks and new keys would have to be distributed to authorized users. This reconfiguration of locks and distribution of new keys was also generally undertaken whenever a user's access was revoked (e.g., because they had ceased employment and were no longer authorized to access the facilities). In any area where large numbers of authorized users were present and there was a frequent turn-over in authorized users (i.e., authorized users were added or cancelled every day), the simple mechanical lock system had significant deficiencies (e.g., high cost, high administrative burden) and, in many respects, was necessarily insecure due to the complexities of updating the system.

The access control system field advanced with the advent of credential cards or "tokens" that utilized new microelectronic technology. These advances made the cumbersome processes of the distribution of new keys and the reconfiguration of lock cylinders less expensive, as each lock no longer required a specific key. Instead, with these new technologies, locks could be programmed to accept certain credential cards or tokens, but not others. In effect, instead of having to distribute different physical keys for each lock (creating a "janitor's key chain" for authorized users), each individual had a universal credential which was accepted by all locking mechanisms in the facility they were authorized to open.

Despite the improvements of this system over the traditional mechanical lock system (such as the elimination of the need for a single user to carry multiple keys), it still had problems, one being the requirement that credential codes had to be adjusted locally at each lock in the system when the access of a particular key had to be changed. Because of the natural turnover in users (i.e., adding and removing users from the system), this system still required frequent updating and intensive manpower to maintain. The maintenance and updating process for this system was labor and cost intensive. Changes in the access database required credential changes at the specific lock location since each lock was independent (none of the devices were attached to a central access database). This required personnel to move from lock-to-lock to reprogram each lock or have the locks brought to a central location which rendered them unavailable for others to use while they were being updated.

The next development in the access control system field involved wiring all of the individual locking mechanisms in the system to a central access controller to create a locking mechanism network. This networked system allowed a security operator to reprogram each locking location from a central command/control station. While these systems solved the problem in previously utilized systems regarding the localized changing of access codes for each locking mechanism, these wired network systems were expensive to deploy and complex to install. For example, each individual locking mechanism had to be hard wired. Further, retrofitting into preexisting structures often proved to be very expensive. In addition, these wired networks were unusable on mobile devices such as drug carts, mobile computer stations, and related objects that were not rigidly attached to the structure.

The next advance in the field of access control systems was an elimination of the need to hard wire each of the individual locking mechanisms to the network by coupling a wireless communications device to each individual lock mechanism. In the operation of these systems, once a credential was presented to a locking mechanism, a signal associated with that credential would be wirelessly transmitted from the locking mechanism to the central access controller to determine whether or not the credential represented an authorized user. Once it was determined whether or not the credential represented an authorized user by the central access controller, a control signal either granting or denying access would be sent from the central access controller to the locking mechanism. Gonzales, et al. (U.S. Pat. No. 5,936,544) provides an example of such a prior art system.

While these systems eliminated some of the problems associated with wire-based access systems, they still had drawbacks. One drawback was the failure of these systems to have an onboard database at each individual locking mechanism that stored the current access information. This required each individual locking mechanism to communicate with the central control database on every entry attempt. This consistent back-and-forth communication resulted in a significant consumption of power. Further, the delay inherent in this communication could be problematic in emergency or normal operations where time is of the essence and the authorized user must quickly enter or exit the authorized area controlled by the locking mechanism. For example, if multiple requests were made to the central control unit simultaneously, or if the wireless communication was interrupted by external factors (such as cell phone signals, radiation usage in a hospital, etc.), an authorized user could experience significant delays in achieving access due to the central access controller having to handle increased traffic or not receiving the necessary requests. Further, if the central access controller experienced failure, none of the individual locking mechanisms would be functional and access to all of the areas controlled by the network would generally be completely denied.

Improvement of the centralized wireless access system occurred with the entrance into the market of access systems such as those described in Rodenbeck, et al. (U.S. Pat. No. 6,720,861). These systems marked an improvement over the original centralized wireless remote access system by their "decentralization" of the locking/unlocking process. Instead of only having a centralized database, these systems placed a decision making apparatus and associated database at each localized locking mechanism.

While these decentralized wireless systems solved the delay problem that was associated with the original centralized wireless systems (and overcame some of the power usage issues), they still had some inherent problems. In these systems, changes to authorized user access (e.g., the addition or deletion of authorized users) were made at the level of the centralized database; these changes were not made at the localized database at each individual locking mechanism. Accordingly, updates for the localized databases at each of the individual locking mechanisms had to be periodically obtained from the centralized server. Thus, the localized locking mechanisms of these systems would periodically request an update from the centralized database for their localized database. These systems would not transmit a signal for each event that occurred at the localized locking mechanism, but instead would periodically request an update for the internal database.

This periodic signal updating methodology was associated with two main problems. First, this methodology could still result in significant delays; access of an authorized user at an individual locking mechanism could be delayed as the system updated by propagation of signals through the system. Second, this methodology could allow a former authorized user whose access rights had been revoked to access the facility for a certain period of time until the update could propagate through the system and update the localized databases of the various locking mechanisms. Thus, this system carried with it a security loophole. Individuals who no longer had access to the facility could access areas in which they were no longer permitted until the time at which the localized database was updated. In addition, individuals who had just been granted access would not be able to access areas which they were authorized to access until the local database had been updated.

Carrieri (U.S. Pat. No. 7,701,452) continued the road of advancement in the access system field by providing enhancements to decentralized wireless access control systems. In the system disclosed in Carrieri, the complete database of access control data is transmitted from the centralized database to the individual locking mechanisms upon any of the following events: 1) an invalid access request signal at the individual locking mechanism; 2) a communication command input at the individual locking mechanism; 3) the expiration of a timer coupled to the individual locking mechanism; or 4) the activation of a transducer that is coupled to the individual locking mechanism by a transducer stimulator located remotely from the transducer. Upon any one of these events, a wireless signal is sent from the localized locking mechanism to the central database instructing it to send an updated database to the localized locking mechanism. If the update was brought about by an invalid access request, after the update the presented credential is compared to the newly updated localized database to determine whether or not the credential represents an authorized user in a "re-comparing" step.

As with the art before it, while Carrieri represents advancement in the field, this approach also has its own flaws. First, this system still allows access to a user whose credentials have been revoked in the loophole from the time at which his or her credentials are revoked to the time at which the localized database automatically updates (e.g., when the timing mechanism expires). If a user's credentials are recognized in the localized database (which they would be if the localized database had not been updated since the time at which the user's credentials had been revoked at the centralized database), the user will be granted access.

Second, the system of Carrieri also unnecessarily consumes energy, resources and power. For example, an entire database update is sent from the centralized database to the localized database everytime an unrecognized credential is presented to a localized locking mechanism. Thus, a full database upgrade (and the loss of bandwidth and power consumption associated with such an upgrade) occurs even when, in the end, the credential is invalid and there have been no changes to the central database.

Third, in large scale applications (where the number of localized locking mechanisms and the number of individual codes in the database is large) the amount of data being transmitted over the network with multiple database upgrades in the Carrieri system could potentially be enormous, causing a huge burden/drain in terms of power consumption. This unnecessary updating of a database which, possibly, has not changed since the last automatic update reduces the usefulness of the network by occupying unnecessary bandwidth and increasing the number of server access calls.

While the above show a clear progression toward improved access control systems and ease of updating, as noted, all of these systems have flaws. In the above systems, there is generally unnecessary energy consumption and use of network bandwidth (as in the system of Carrieri) when a complete database upgrade is sent to an individual locking mechanism every time an unrecognized credential is presented. Further, each of above systems has a security loophole present in which there is a period of time in which a previously authorized user whose credentials have been revoked has access rights in the system until the next regularly scheduled update from the centralized database.

Another problem with the above systems is that they do not provide for a system that ensures that a cascade access is made correctly by an authorized user. A cascade access requires a user to present security credentials to access a first level of security, then once past the first level the user must present further credentials to access a further, deeper level of security. One example of a common application for a cascaded security lock is a hospital's anesthesia cart. A number of hospital personnel may be allowed to access the cart to obtain anesthesia paraphernalia and drugs (the first level of security). However, certain controlled substances (such as narcotics) may be stored on the same cart, but will only be accessible to those with a heightened level of security access (the second level of security). In most present systems, the second level of security requires the presence of a credential to open the first level of security, and an unrelated credential to open the second. However, in the presently utilized cascade systems there is generally no indication that the credential used to gain access to the first level of security corresponds to the credential used to gain access to the second level of security. There is no connection between the security credentials for the first level of access and the second level of access. Accordingly, these unconnected systems could potentially be accessed insecurely by use of multiple different security credentials.

SUMMARY OF THE INVENTION

Due to these and other problems in the art, disclosed herein, among other things, is an interlinked cascade wireless access control system, the interlinked cascade wireless access control system comprising: a central wireless access system; a remote wireless access system, the remote wireless access system being comprised of a plurality of remote access controllers located at access points; and a wireless network connecting the central wireless access system to the remote wireless access system; wherein an individual access point contains a first remote access controller representing a first level of security and at least one additional remote access controller representing a second level of security; wherein the first remote access controller must be disengaged by a first credential before the at least one additional remote access controller can be disengaged; and wherein the at least one additional remote access controller will not be disengaged unless a second credential presented to the at least one additional remote access controller belongs to an identical user as the first credential.

In one embodiment of the interlinked cascade wireless access control system, the second level of security is physically located within an area whose access is controlled by the first remote access controller.

In another embodiment, the interlinked cascade wireless access control system is utilized in a hospital setting. When utilized in a hospital setting, in one embodiment, it is contemplated that the interlinked cascade wireless access control system the access point is a controlled substances cart.

Other contemplated embodiments of the interlinked cascade wireless access control system include embodiments where the first remote access controller and the at least one additional remote access controller are disengaged either sequentially or simultaneously.

In some embodiments of the interlinked cascade wireless access control system, the first credential will be a physical credential and the second credential will be an access code.

In yet another embodiment of the interlinked cascade wireless access control system, the first access controller will send a signal representative of the first credential to the central wireless access system after the first access controller is disengaged; the at least one additional remote access controller will send a signal to the central access controller after the second credential is presented; the central access controller will determine whether the second credential belongs to the identical user as the first credential; the central access server will send a signal to the at least one additional remote access controller instructing it to disengage if the second credential is valid and belongs to an identical user as the first credential; and the central access server will send a signal to the at least one additional remote access controller instructing it to remain locked if the second credential is invalid or if the second credential does not belong to an identical user as the first credential.

It is also contemplated that the interlinked cascade wireless access control system can be further comprised of: a timing mechanism preset for a determined period of time; wherein the disengagement of the first remote access controller starts the timing mechanism; and wherein the system will lock-up if the at least one additional remote access controller is not disengaged prior to the expiration of the timing mechanism.

In other embodiments it is also contemplated that the system may be further comprised of a plurality of deeper levels of security.

Also disclosed herein is a wireless access control method for controlling access to a plurality of remote access controllers in a wireless access control system comprising a central access control system comprising a central server and a central wireless communicator coupled by a wireless network to a remote access control system comprising a plurality of remote access controllers, the method comprising: storing a localized access database at each remote access controller wherein said localized access database is indicative of authorized users; receiving a credential at a remote access receiving device of a single remote access controller; checking for a flag in the wireless access control system, the flag representing a removal of at least one flagged credential from the localized access database; removing the flagged credential from the localized access database; comparing the credential to the localized access database; authorizing access at the remote access controller if the comparing step is indicative of an authorized user; activating a remote wireless communicator in the remote access controller to initiate a wireless communication between the remote wireless communicator and the central wireless communicator over the wireless network when the comparing step is not indicative of an authorized user; sending a signal to the central server; comparing the signal to a central access database; sending a signal from the central server to the remote access controller across the wireless network authorizing access at the remote access controller if the comparing the signal step is indicative of an authorized user; and sending a signal from the central server to the remote access controller across the wireless network denying access at the remote access controller if the comparing the signal step is not indicative of an authorized user.

In one embodiment of the wireless access control method, the remote access controller will be comprised of: a remote wireless communicator; an access request receiving device; a remote processor; a remote storage device; a control circuit; a locking mechanism; and a local communications device.

In another embodiment, it is contemplated that the wireless access control method will also comprise the further step of: activating a remote wireless communicator in the remote access controller to initiate a wireless communication between the remote wireless communicator and the central wireless communicator over the wireless network at periodic intervals for a routine database upgrade.

In another embodiment, it is contemplated that the wireless access control method will also comprise the further step of: activating a remote wireless communicator in the remote access controller to initiate a wireless communication between the remote wireless communicator and the central wireless communicator over the wireless network when command input for an update is entered into the remote wireless communicator.

In yet another embodiment, it is contemplated that the wireless access control method will also comprise the further step of: activating a remote wireless communicator in the remote access controller to initiate a wireless communication between the remote wireless communicator and the central wireless communicator over the wireless network when a wake up sensor is activated.

In one embodiment of the wireless access control method, when the wireless access control system is not transmitting or receiving information the wireless access control system will be in a standby power conserving mode.

It is also contemplated that in some embodiments, of the wireless access control method, the remote access controllers will also provide for monitoring and verification of a variety of safety parameters.

In one embodiment of the wireless access control method, the signal will be encrypted.

In yet another embodiment of the wireless access control method, the signal will be comprised of: a validation code that describes the localized database; and an identifier of the credential.

Also disclosed herein is a wireless access control system for controlling access to a plurality of remote access controllers, the system comprising: a means for storing a localized access database at each remote access controller wherein the localized access database is indicative of authorized users; a means for receiving a credential at a single remote access controller; a means for comparing the credential to the localized access database; a means for authorizing access at the remote access controller if comparing the credential to the localized access database is indicative of an authorized user; a means for sending a first signal to a central access control system over a wireless network from the remote access controller when said comparing step is not indicative of an authorized user; a means for comparing the first signal to a central access database; a means for sending a second signal from the central access control system to the remote access controller across the wireless network authorizing access at the remote access controller if the comparing the first signal is indicative of an authorized user; and a means for sending a second signal from the central access control system to the remote access controller across the wireless network denying access at the remote access controller if the comparing the first signal is not indicative of an authorized user.

DESCRIPTION OF THE PREFERRED EMBODIMENT(S)

Generally, the wireless access control system discussed herein comprises a central access control system connected through a wireless network to a remote access control system comprised of a plurality of localized remote access controllers (locking mechanisms). The plurality of remote access controllers will generally be used to lock parts of a facility, whether physical facilities, parts thereof or mobile components within the facilities, and will allow for a supervisory function to determine which users of the system are allowed to access which resources within a facility. While the system disclosed herein will, at times, be described with a single remote access controller for illustrative purposes, it should be recognized that, in most commercial applications of the system, the central access control system will be coupled to a plurality of remote access controllers.

In an embodiment, the system comprises a wireless access control system for use in a business, hospital, or similar facility where certain users only have access to certain portions of the facility. Thus, locks will generally be positioned to grant or deny access to a user seeking to access certain secure areas of the facility (e.g. maternity wards), carts, controlled substance storage devices, cabinets, drawers, containers, server enclosures, electronic racks, and individual servers. While, in some parts, this application will focus on the use of the wireless access control system described herein in a hospital setting, it should be noted that description of the system in this setting is only illustrative. Any setting or application which requires an access system to secure different areas and/or objects within a facility is contemplated as a possible setting and application for the access control system disclosed herein.

Figure 1:
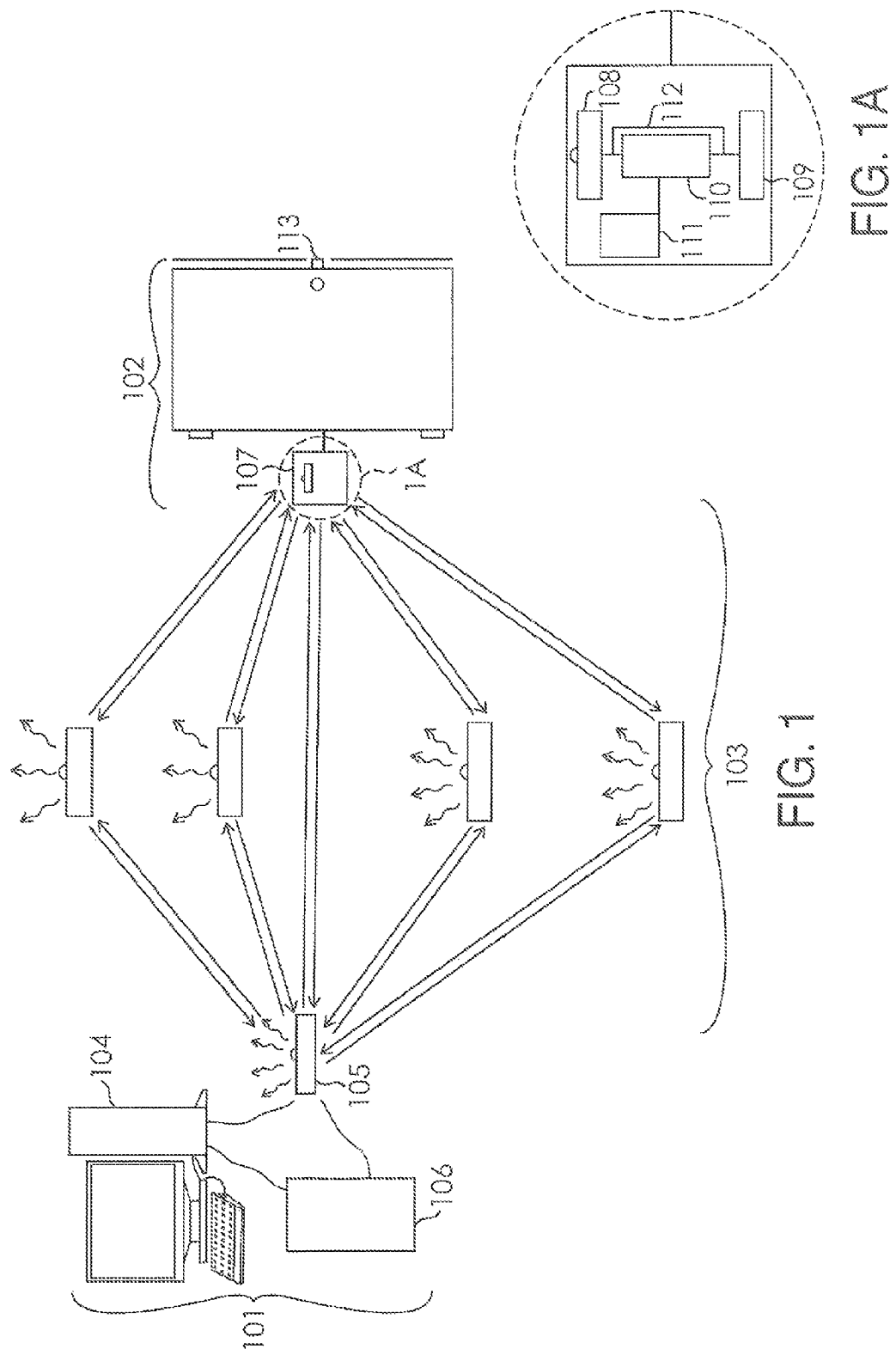
FIG. 1 provides a diagrammatic representation of an embodiment of a wireless access control system of the present invention.

FIG. 1 provides a diagrammatic representation of an embodiment of the wireless access control system of the present invention. In the depicted embodiment, the system generally comprises a central access control system (101) coupled to a remote access control system (102) via a wireless network (103).

The central access control system (101) is generally comprised of a central access server (104) and at least one central wireless communicator (105). The central access server (104) generally comprises a software system known to those of skill in the art which has the capability to control, operate and manipulate the information stored on the central access server (104), in addition to operating the central wireless communicator (105). The central access server (104) can be an individual server or a plurality of servers linked together.

In some embodiments of the central access server (104), in order to assist with the storage of access information, the central access sever (104) will be coupled to one or more central databases (106) or other data storage mechanisms such as, but not limited to, a hard drive or non-volatile chip memory. Generally, the access information stored on the central access server (104) and/or the central database (106) includes, but is not limited to, a data set of permissible users, log-in information, and other user control data related to the access control system. Thus, among other functions, the central access server (104) can be used to store access control data and provide access control data to, or receive access control data from, the remote access control system (102).

The central wireless communicator (105) generally comprises any device known to those of skill in the art for the communication of data between two devices without the use of wires. Contemplated modes of wireless communication include, but are not limited to, radio frequency using a single or multi-frequency method, radio frequency spread spectrum, digital spectrum spread, infrared, audio, ultrasonic, etc. Future wireless technologies as would be known to one of ordinary skill in the art are also contemplated modes of wireless communication.

It should be understood that the individual components of the central access control system (101) (e.g., the central access server (104), the central wireless communicator (105) and the central database (106)) are interlinked in such a way, as known to one of ordinary skill in the art, to allow for the transportation of information and data there-between. Examples of possible connection modalities include, but are not limited to, wires, cables, control circuits, and/or wireless technology.

The remote access control system (102) is generally comprised of a plurality of localized remote access controllers (locks) (107). Generally, these localized remote access controllers (107) will be mounted to a door, ingress/egress, waypoint, fixture, object, piece of equipment or other object or space where access to that object or space must be controlled or limited to certain authorized users. A single remote access controller (107) can be fastened to a fixture or wall at a point of ingress and egress to a secure space with a through-hole for cabling to connect to a wired power supply. Alternatively, in other embodiments, the remote access controller (107) will be powered by an unconnected power supply (such as a battery) and can be placed on the exterior of the object or fixture or wall of the secure space, with the remaining components of the controller located within a generally enclosed casing, generally inaccessible without gaining access to the interior area of the resource. The remote access controllers (107) are generally configured to control the locking and unlocking of respective doors, carts, cabinets, etc. to the objects or spaces to which they are associated, allowing only users who have valid credentials access to the space or the contents within the object.

The remote access control system (102) generally communicates with the central access control system (101) for the transmission of information and data between the central access control system (101) and the remote access control system (102) (creating a bi-lateral highway of communication and information transfer). The information communicated between these two systems includes, but is not limited to, periodic updates of access information, historical information concerning access attempts, the number of times drawers or doors associated with the remote access control database have been opened/closed and any data that is collected by the remote access controller (107) including, but not limited to, battery voltage, temperature of the container, humidity, and presence of selected gases.

Accordingly, the localized remote access controllers (107) generally provide for remote monitoring and verification of a variety of safety parameters at the controllers (107) in addition to access control. Thus, if a controller (107) is placed in an area where a certain environment is necessary, for example, the controller (107) need not only restrict access to the area but can also provide information regarding and monitoring of the environment back to the central access control system (101) as well. While monitoring is not used in all embodiments of the system disclosed herein, it can provide for increased functionality in some situations. In one embodiment, all the remote access controllers (107) will contain the same software code and generally be considered interchangeable other than the type of locking mechanism (113) they are designed to engage and disengage and, thus, the type of resource they are designed to secure.

In one embodiment, each remote access controller (107) will be generally comprised of a remote wireless communicator (108), an access request receiving device (109), a remote processor (110), a remote storage device (111), a control circuit (112) and a locking mechanism (113).

It is contemplated that the access request receiving device (109) can be comprised of any technology in the art for receiving a user's credentials. Contemplated access request receiving devices (109) include, but are not limited to, card readers, wireless receivers and biometric readers. As used herein, it should be understood that the term "credentials" can refer to a physical credential known to one of ordinary skill in the art such as a keycard or token, in addition to biometric parameters, codes and other access request modalities known to those of ordinary skill in the art. The access request receiving device (109), in some embodiments, can also be a plug-in communication port, a wireless receiver, a keypad, or any other device known to one of ordinary skill in the art for a user to enter credentials in the form of command communication input.

In certain embodiments, the remote receiving device (109) is capable of reading and writing data to the remote storage device (111) when credentials are presented to the remote receiving device (109). The remote storage device (111) is generally a localized database or other localized data storing module for the storage of data sets or other information received either from the central access control system (101) via the wireless network (103) or received locally at the site of a remote access controller (107). Any database, hard drive, non-volatile chip memory or other data storage technology known to those of skill in the art is contemplated as a possible remote storage device (111). Examples of information that will be stored on the remote storage device (111) includes, but is not limited to, a localized access database, entry statistics, program code and other data or information related to the access control system.

The remote wireless communicator (108) generally functions to receive and transmit wireless information to and from the central server (104) via the central wireless communicator (105) according to the wireless methodologies discussed herein, creating the wireless network (103). It should be noted that the wireless network (103) can comprise wireless communication between a single central wireless communicator (105) and a single remote wireless communicator (108) and/or a plurality of central wireless communicators (105) and a plurality of remote wireless communicators (108). In some embodiments, the wireless network (103) can be further comprised of intermediate wireless communicators or nodes between the central wireless communicator(s) (105) and the remote wireless communicator(s) (108) in the wireless network (103). These intermediate wireless communicators or nodes can act as access points, bridging relays or serve another function known to those of skill in the art to assist in the smooth and efficient functioning of the transfer of information and data between the central access system (101) and the remote access system (102) via the wireless network (103).

Contemplated information for transmission between the central and remote wireless communicators (105) (108) includes, but is not limited to, access database information, access event information and remote access controller (107) information (e.g., environment, status, etc.). The information communicated between the remote wireless communicator (108) and the central wireless communicator (105) may or may not be encrypted and may or may not be in the form of packet data.

The locking mechanism (113) is any electromechanical fastening device known to those of ordinary skill in the art. Contemplated locking mechanisms (113) include, but are not limited to, electric strike, electromechanical strike, electro-optical strike, keycard, magnetic, biometric and radio frequency.

Figure 2:
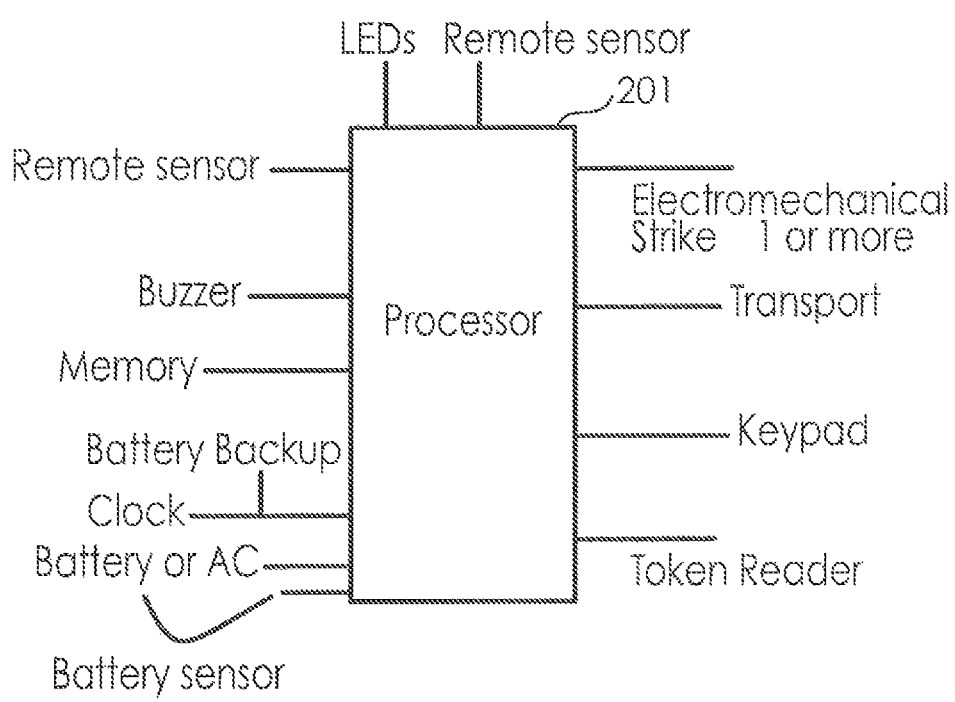
FIG. 2 provides a block diagram of an embodiment of a remote processor with attached components usable in an embodiment of the present invention.

The access request receiving device (109), the remote storage device (111), the remote wireless communicator (108) and the remote locking mechanism (113) (along with any other component of the remote access controller (107)) are all generally connected to and controlled by the remote processor (110) via the control circuit (112). The control circuit (112), in some embodiments, also serves to interconnect the various components of the remote access controller (107) for communication and data transfer between each of the components. Generally, any circuit mechanism known to those of ordinary skill in the art for the transfer of data or information is contemplated as a modality for the command circuit of this application. In addition to determining whether or not a certain credential represents an authorized user (by comparing the credential to the stored localized access database), the processor (110) has the capability to record that an access event occurred, along with other information about the access event and the environment of the remote access controller (107). Generally, any processor technology or means known to those of skill in the art is contemplated as the processor (110) of the remote access control system (102). An exemplary embodiment of the organization of a remote processor (110) is provided in FIG. 2.

In another embodiment, the remote controller (107) will further comprise a local communications device (114) to provide a means for entering command communications into a remote access controller (107) in case of a need to manually update the remote storage device (111), upload a new software program or other upgrades, programming or communication which may be required. This local communications device (114) can be a plug-in communications port (e.g., a serial, TTL, USB), a wireless receiver (e.g., a Bluetooth receiver), a keypad or any other means known to those of skill in the art for a system programmer to provide command data locally to the remote access control system (102) at each individual remote access controller (107).

Other contemplated components of the remote access controllers (107) or the remote access system (102) include, but are not limited to, a power supply (such as a battery or AC/DC), a power supply back-up (such as a battery), a battery sensor, a timing mechanism, a buzzer and a lighting mechanism (such as an LED).

Generally the access control system disclosed herein, and all of the components thereof, will, typically, be placed in a mode to conserve power and resources. For example, in one embodiment the central wireless communicator(s) (105) and the remote wireless communicator(s) (108) can have different modes to more efficiently utilize power consumption. Possible modes include, but are not limited to, a standby/sleep mode (a mode in which no information/data is transmitted or received), a transmission mode (a mode in which information/data can be transmitted or received), and a receiving mode (a mode in which information/data can be received but not transmitted). Contemplated power sources for the access control system disclosed herein include AC/DC, battery and solar, amongst other power sources known to those of ordinary skill in the art.

While the access system disclosed herein has generally been described as having a single remote controller (107) at each access point in the access control system, in the healthcare field, as well as in other fields where increased security may be necessary for certain aspects of the facility, there may be a need to have two or more linked remote controllers (107) at a single access point. For example, federal regulations specify that controlled substances stored on control substance carts be controlled by at least two separate locking mechanisms controlled by two separate access codes. The access control system described herein has the capability to function with single remote controllers (107) at access points or two or more interlinked, or "cascaded," remote controllers (107) at access points.

At access points where two or more remote access controllers (107) are present, in one embodiment, a user will be able to open both of the interlinked remote access controllers (107) with the same credential if the credential is associated with access to both the first controller (107) (the first level of security) and the second controller (107) (the second level of security) in the access database.

Alternatively, in another embodiment, the access control system can have a cascade lock system that requires unique credentials for each controller (107) in the cascade—a separate credential is required for the first and second level of security. In this configuration, each controller (107) in the cascade is opened separately, the controller (107) in the first level of security being disengaged when presented with a proper credential and the controller (107) in the second level of security being disengaged when presented with a proper credential (the second credential being different from the first credential) and only being disengaged until after the first controller is already open.

In one embodiment of the cascade lock system where unique credentials are required for each controller (107), in order to provide for a more effective cascade lock, the separate credentials required to access the first and second level of security will be interlinked and assigned to the same user. In this interlinked two credential system, once a user has opened the first controller (107) (e.g., general access to an anesthesia cart) the only credential that will grant access to the second level of security and open the second controller (107) is a second credential that is assigned to the same user. The first and second credential required to access the full cascade of controllers are interlinked because they are both associated with the same user.

This interlinked cascade lock and access system closes a security loophole that was present in previously utilized cascade lock systems. Specifically, it prevents another user from gaining access to the second level of security by inputting a valid credential for the second level of security, but not one associated with the current user of the anesthesia cart. Without interlinking the locks of the cascade, it is possible for a user having only authorized rights to the first level of security to access the second level of security by simply acquiring from another individual a valid credential for the second level of security—there is no requirement for a correlation between the separate credentials required to access the first level of security and the second level of security. The interlinked cascade system only grants access to one individual at a time until the current user has reengaged all of the controllers (107) in the access control system.

The interlinking of the credentials required to access different levels of security for a particular access point, in some embodiments, may be accomplished by having the second controller (the second level of security) (107) query the central server (104) to determine whether the access first controller (the first level of security) (107) was accessed by a credential associated with the same user to whom the second credential presented to the second controller (107) is associated. Thus, a user may obtain access to the first controller (the first level of security) (107) in the cascade by presented a valid credential. Once the first controller is open (the first level of security is accessed), it can send a signal to the central server (104) regarding the credential that was presented to open the locking mechanism (113). Upon a credential being presented to the second controller, the second controller (the second level of security) (107) will communicate to either the first controller (107) or the central server (104) via the wireless network (103) to determine the user who is associated in the access database with the credential used to open the first controller (107). The second controller (107) will only open if the credential presented to it is valid and is linked to the same individual whose credential opened the first controller (107).

This interlinked cascade system presents a higher level of security. For example, in this system, if an individual were to view a typed password a different user entered into a second controller (107) to gain access to the second level of security, the individual would not be able to open the first controller (107) with their credentials and then use the stolen credentials to access the second controller (107) because the two credentials are not interlinked to the same user. Instead, the individual would have to obtain credentials to the first and the second controller (107) from the one user who had access to both levels of security to open both controllers (107).

In a cascade system, such as those utilized in the healthcare industry, the interlinked cascade system may be particularly powerful because opening the first controller (107) might require a physical credential, while opening the second controller (107) might require an entered access code. In the interlinked cascade system, the individual opening the second controller (107) using their PIN would have to have also presented a physical credential associated with him to open the first controller (107). As the loss of a physical credential is more easily detected than an individual stealing or figuring out a PIN, the system gains heightened security. The interlinked cascade system makes it harder for the second level of security to be accessed by someone not authorized to do so.

Accordingly, it is contemplated that the interlinked cascade lock system may be entirely disengaged by a single physical credential or the presentation of multiple physical credentials or passwords all associated with the same user to open the complete cascade of locks. In this way, a user can either unlock both locks in succession (if they are authorized to do so) or can simply open the first controller (107) (should that be the extent of their desired access) in a single action. Should a user elect to only open the first level of security, the second level of security will be completely locked out (i.e., it will accept no other authorized users including the user who opened the first controller) until the outer lock is reengaged and the locks are simultaneously opened by a single user with credentials to access both levels of security.

It should be understood that while the interlinked cascade locking system described herein generally referred to only a first and a second level of security, any number of cascaded security levels is contemplated in interlinked cascade locking system of this application. The first and second level of security was simply used for illustrative purposes to describe the functioning of the cascade lock system.

In operation, the access control system generally utilizes decentralized localized authentication of users at the level of the remote access controller (107) with wireless updates to the remote access controller (107). In part, to conserve the energy and resources of the system, a wireless update for an individual remote access controller (107) will occur upon one of the following events: 1) when querying for an unknown credential; 2) when performing routine database checks and upgrades; 3) when a command input for an update is entered into the local communications device (114); and 4) activation of a "wake up" sensor linked to the remote processor (110) such that when the sensor is presented with a specific event an immediate signal is sent to the remote processor (110) which, in turn, instantly forwards the sensor information to the central database (106).

One of the times at which access information will be exchanged between the central access system (101) and the remote access system (102) across the wireless network (103) is the periodically scheduled routine database check and upgrade. In these periodically scheduled update periods, the central access control system (101) will send access database upgrades to the remote controllers (107) of the remote access control system (102) to update the localized access database located at each remote controller (107). In addition, in these periodically scheduled update periods, the remote controllers (107) of the remote access control system (102) can send information to the central access control system (101) regarding access attempts at the remote controller (107). Such information includes, but is not limited to, historical information regarding access attempts, the number of times a door or drawer has been opened or closed and any remote sensor data that is collected by the controller (107) including but not limited to, battery voltage, temperature of the container, humidity and the presence of selected gases. So as to prevent overloading network traffic at any one time, in one embodiment it is contemplated that the individual remote access controllers (107) will be randomly assigned different intervals for automatic database updates. Further, it is also contemplated that the individual remote access controllers (107) can be programmed to update at night or other times when the system is not in heavy use, thus preventing overloading the communication structure and slowing down the wireless access control system.

Another time at which access information will be exchanged between the central access system (101) and the remote access system (102) is when the wireless access control system is presented with an unknown credential. When a remote access controller (107) is presented with an invalid access credential (a code that is not identified on its localized database as allowed to disengage the specific lock) the remote controller (107) immediately initiates a call to the central access system (101).

The remote call sends two pieces of information. The first piece of information is a validation code or cryptogenic hash that describes the structure, size and content of the current localized database stored at the remote access controller (107). This code or hash is not a transmission of the full localized database, but rather a smaller, summarized "version" of the database that is presently stored at the remote access controller (107). The second piece of information sent in the remote call is an identifier of the invalid credential that was utilized for the access attempt.

If the validation code matches the central access database, then the central access database has not been updated or modified since the localized access database was last modified (the localized database is the same as the central database) and a message is returned to the remote access controller (107) from which the signal originated that the credential is not valid and access should be denied. If the validation code is different than the central access database (which implies that the central database has been updated since the last update to the localized database), the central access server (104) looks to the central access database to determine if the supplied credential (the second piece of information sent in the signal) is authorized to disengage the lock to which the credential has been presented. If the credential is not found in the central access database (indicating that the user is not authorized to access that specific lock) then a message is returned to the remote access controller (107) from which the signal originated that the credential is not valid and access should be denied. If the credential correlates to a valid access credential in the central access database, then a message is returned to the remote access controller (107) from which the signal originated that the credential is valid and access should be granted.

It should be noted that in the information transfer that occurs when an invalid credential is presented to a remote access controller (107), the localized access database at the remote access controller (107) is not updated when the remote call is sent. Instead, the localized access database is only upgraded in accordance to the regularly programmed update schedule (or a sensory initiated or command control initiated upgrade). This is one of the points of differentiation of the present access control system from real time decentralized access control systems of the prior art, such as Carrieri. In those systems, a complete database update was sent to the remote access controller (107) each time an invalid credential was presented, even if no changes had been made to the central access database since the last time the remote access database was updated.

The advantages of this system are its ability to save resources and increase the efficiency of the system as a whole. In the event that a user is denied access under either of the first two scenarios, there is no need to update the localized access database at the remote access controller (107), as either no update is required (the localized access database and the centralized access database are the same) or the credential is invalid. Therefore, until an alternative, unrecognized, valid credential is presented, the onboard information is still accurate and power, bandwidth and other resources do not need to be used for an entire database upgrade. Further, even if the centralized access database has been changed since the last periodic update and the access is valid, the lock has already been instructed to disengage and the need to update is not immediately necessary. In this way, remote access controllers (107) will generally always operate on current database versions until the assigned periodic update time. As the assigned times can be purposefully chosen to be at night or at other times when the resources in use are reduced, this can prevent overloading the communication infrastructure and slowing down the system.

While the ability to update the wireless access control system to include new authorized users is important, it is in many respects even more important that when security access is revoked from a user, such change propagates as quickly, if not more quickly, than when a new authorized access credential is added. In some situations, access need not be immediately revoked. For example, if the user with revoked credentials is otherwise inhibited from having access to their revoked credentials or the remote units (e.g., they are physically prevented from entering the premises). In this case, the revocation can occur using only the standard random update methodology discussed previously.

However, when a specific access code needs to be removed immediately, without waiting for a routine random update (e.g., because a valid credential was lost or otherwise may have become compromised), an administrator will indicate at the central control server (104) that the removed credential is a priority removal. This will trigger a software feature, in some embodiments called "ER" (emergency removal), to be activated. Through ER, the central access server (104) places a variable or "flag" on each interconnect node or remote access controller (107) located throughout the wireless access control system for a set-time period or until the next periodic update of the localized access databases of the remote access controllers (107). Each flag will include the credential(s) to be removed or rendered inactive. Each time a remote access controller (107) is activated by any attempted access, the remote access controller (107) may be instructed to check the closest interconnect node or its own remote processor (110) and/or remote storage device (111) to determine if an emergency removal notice flag is active. While it is generally preferred that a controller (107) perform the ER check with every access attempt, this is not strictly required and it may, alternatively, perform the check after a certain number of access requests, or only according to a predefined schedule.

If the emergency removal notice flag is indicated, the remote access controller (107) will query its localized access database and remove the flagged credential, if it is present in the localized access database. After this removal step, the standardized comparison access process is performed by the remote processor (110) with the updated localized access database. Thus, should the presented credential have been a credential belonging to an individual whose access has been revoked, the credential has been removed from the localized access database. If the presented code is not the removed code, the onboard database has been updated anyway with the removal of the revoked credential and the credential, therefore, will be recognized as "invalid" in the future. Thus, it is possible to very quickly propagate a necessary change through the system, as the change can occur at each remote access controller (107) with the next access attempt (by any party) at the remote access controller (107). After all of the remote access controllers (107) in the wireless access control system are updated, the emergency removal notice flag is returned to a null value.

When a remote access controller (107) is initially populated with data, the user of the application determines the number of periodic updates that a remote access controller (107) will perform in a twenty-four hour period along with the time at which they will occur. In addition, how often an "ER" lockup will occur can be programmed into the remote processor (110). The application, through a randomization algorithm that specifies the timing of routine onboard access database updates and downloads, will store specific timing intervals both centrally and in the remote access controllers (107).

Figure 4:
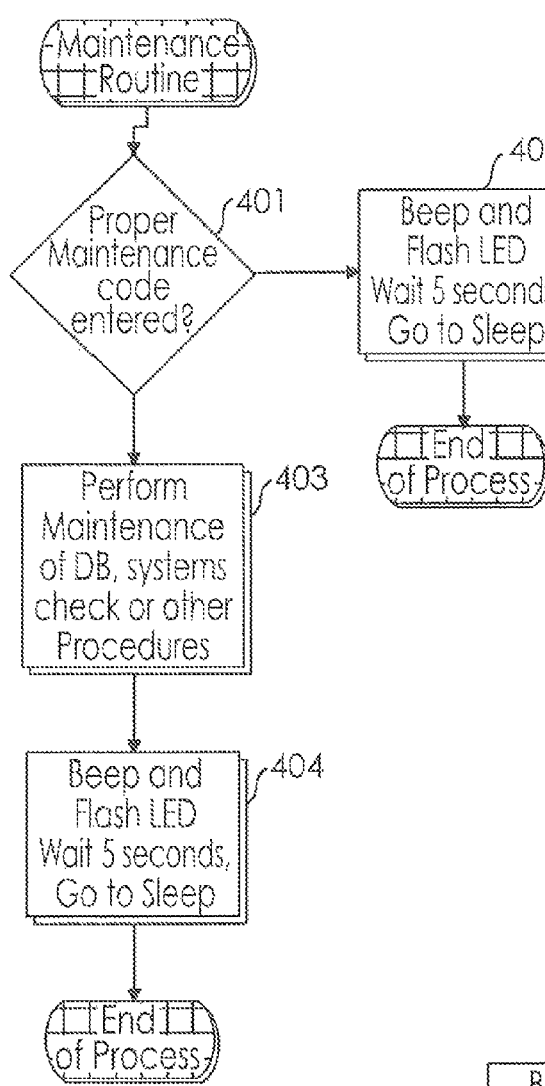
FIG. 4 shows a flowchart of an embodiment of a maintenance routine carried out by an embodiment of the present wireless access control system.

Yet another time period during which access information will be exchanged between the central access system (101) and the remote access system (102) is when a command input for an update is entered into the local communications device (114). This is generally a forced update maintenance routine. A flowchart showing an embodiment of a forced update maintenance routine is provided in FIG. 4. In the embodiment provided in FIG. 4, a command input is entered into the local communications device (114) and the remote processor (110) inquires as to whether a proper maintenance code was entered (401). If the maintenance code is incorrect, the remote access controller (107) will return to a sleep mode (402). If the maintenance code is correct, the processor (110) will send a signal to the central access system (101) for updates and perform maintenance of the localized database, a systems check and other needed procedures (403). After the maintenance is completed, the remote access controller (107) will return to a sleep mode (404).

In some embodiments, it is contemplated that the access control system is a self-forming and self-healing network. "Self-forming" means that the wireless network (103) of the access control system establishes itself and each remote access controller (107) automatically integrates itself into the network (103). For example, once installed at the secure area, a remote access controller (107) can configure itself into the access control system. Thus, each remote access controller (107), when initially installed, notifies the central access control system (101) via the wireless network (103) of its availability for inclusion in the access control system. This allows an individual to upgrade to the full wireless system without physically touching the installed components of the system. This "self-forming" property allows for individual locks to be added and removed from the system simply.

It is contemplated that, in some embodiments of the access control system, the remote access controller(s) (107) can be used as individual units, separate from the central control system (101). This embodiment would generally be utilized in situations in which individuals want each remote access controller (107) to operate as a standalone module (i.e., they are not connected to the central access server (104)). In the event that an individual wants to upgrade from standalone remote access controllers (107) to a full wireless access system, the individual would be able to upgrade without physical manipulation of the previously installed remote access controller (107) components as the access control system can "self-form;" i.e., the system can automatically configure itself when the central server (104) is set-up and brought online.

Figure 5:
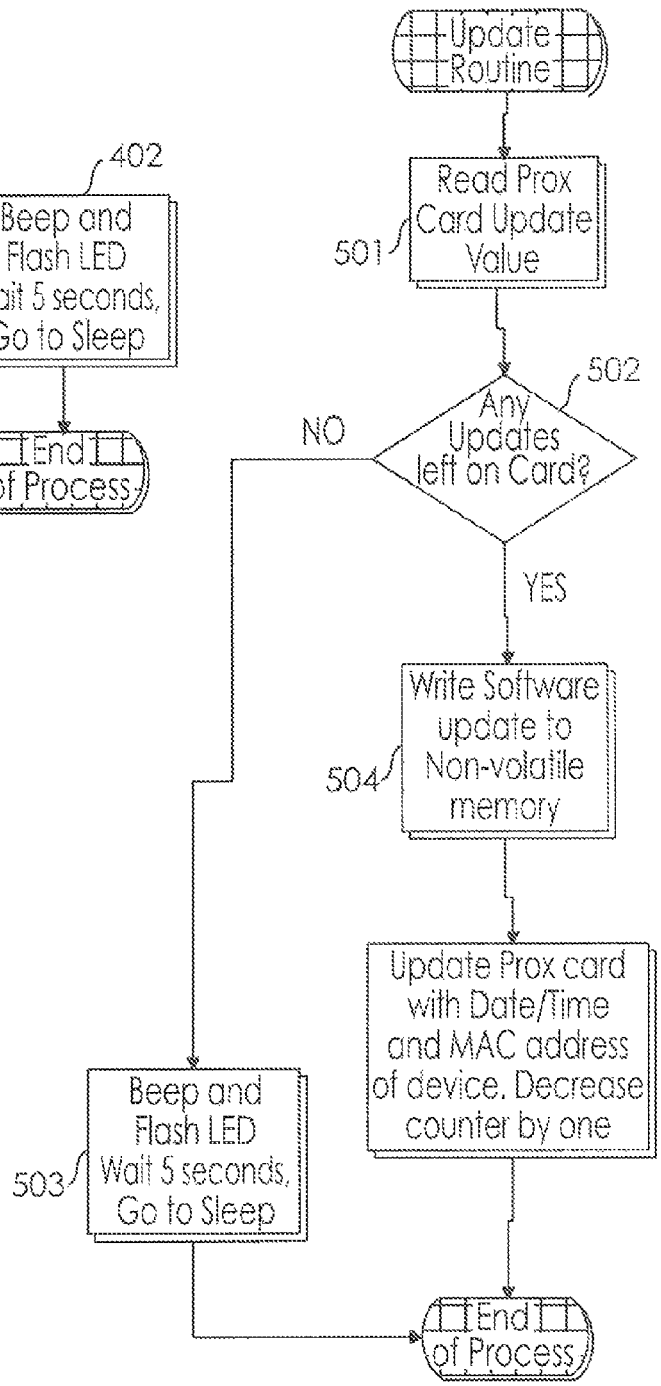
FIG. 5 shows a flowchart of an embodiment of an update routine carried out by an embodiment of the present wireless access control system.

While a self-forming network is contemplated in some embodiments of the access control system, it is also contemplated that individual remote access controllers (107) can also be added to the wireless access system via any manual upgrade method known to one of ordinary skill in the art. One example of a contemplated manual upgrade method is the "card upgrade" method. A flow chart of an embodiment of the card upgrade method is provided in FIG. 5.

In the "card upgrade" method, the upgrade is instigated by an upgrade card. The upgrade card can be read by the access request receiving device (109) (501). Embedded within the upgrade card, under a security code, are the total number of remote access controllers (107) that can be upgraded. Once the upgrade card is read by the access request receiving device (109), the processor (110) asks whether there are any upgrades left on the upgrade card (502). If there are no upgrades left, the remote access controller (107) will generally return to a sleep mode (503). If there are upgrades left on the upgrade card, the remote processor (110) downloads the multi-bit code onto the remote storage device (111) (504). The remote processor (110) then changes the value stored to the remote storage device (111) into a specific value, and the remote processor (110) writes to the upgrade card the MAC address of the controller (107) and the time and date the process occurred (505). The number of updates remaining on the upgrade card will be decremented by one to reflect the number of upgrades remaining (505).

If someone tries to update a remote controller (107) that has already been updated, the software on the remote access controller (107) will generally allow the update but will not decrement the number of updates remaining on the upgrade card and the date and time of the update may or may not be amended. Once the multi-bit code has changed, the remote processor (110) will generally reboot. The upgraded code (already stored on the remote processor (110) or remote storage device (111)) is activated once the remote processor (110) reads the multi-bit code after a reboot and will indicate to the remote controller (107) how to integrate itself into the access control system.

"Self-healing," as that term is used in this application, means that if an intermediate node in the wireless network (103) fails for any reason, other nodes of the wireless network (103) will automatically route signals around the failed node, thus keeping the wireless network (103) intact.

Figure 3A:
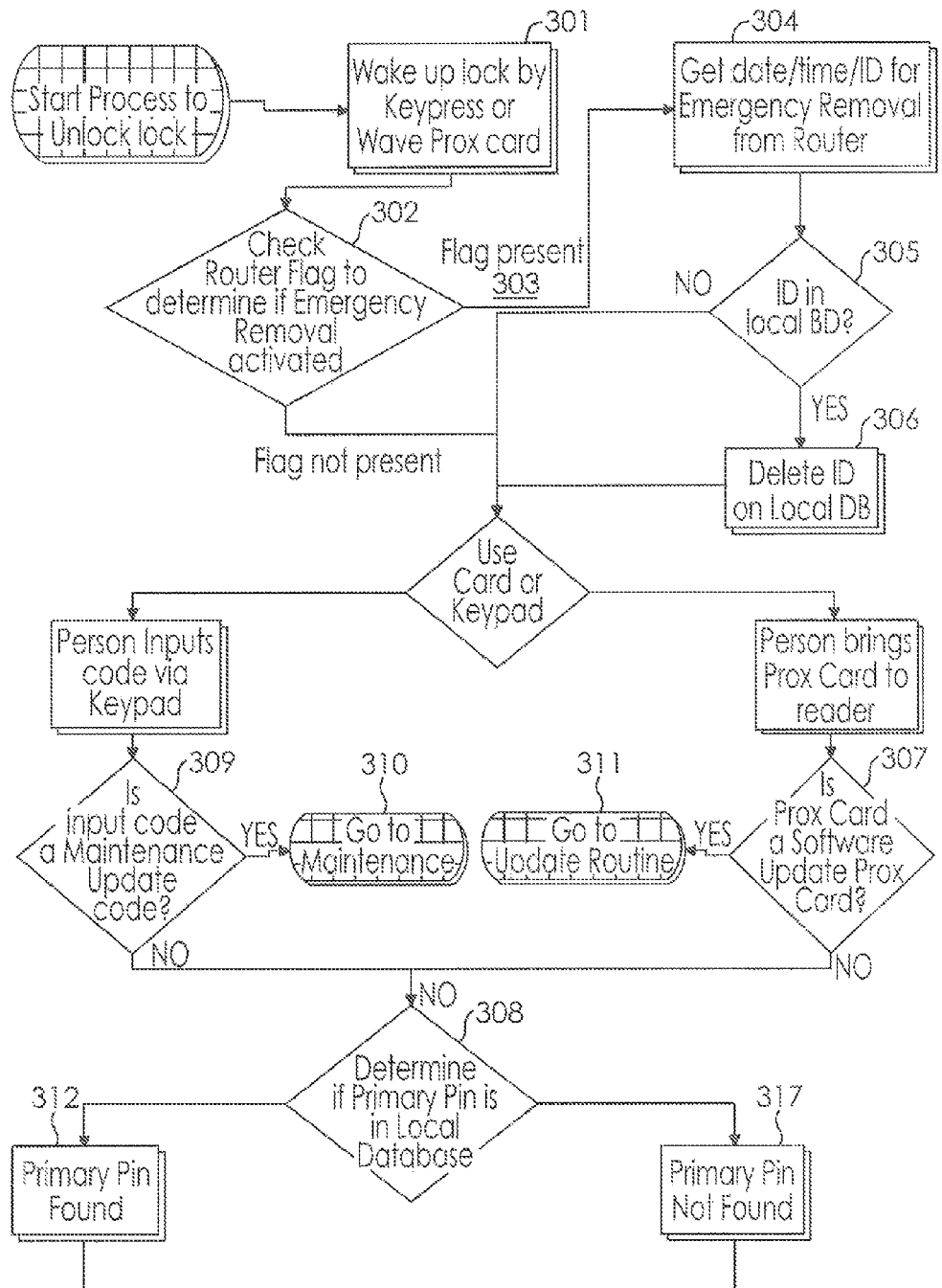
FIGS. 3A, 3B, and 3C show an embodiment of a flowchart of the authentication procedure to be carried out by an embodiment of the present wireless access control system.
Figure 3B:
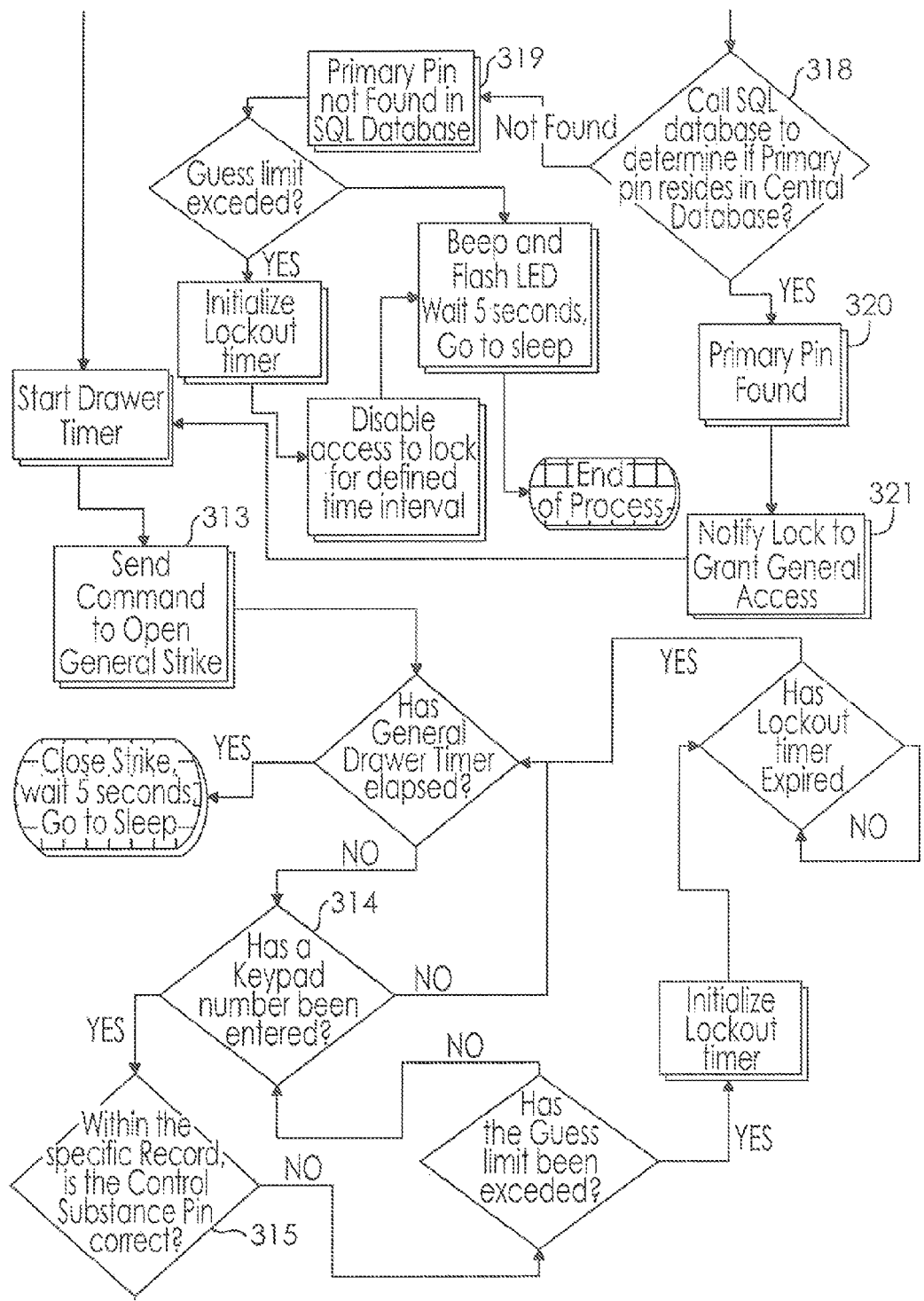
Figure 3C:
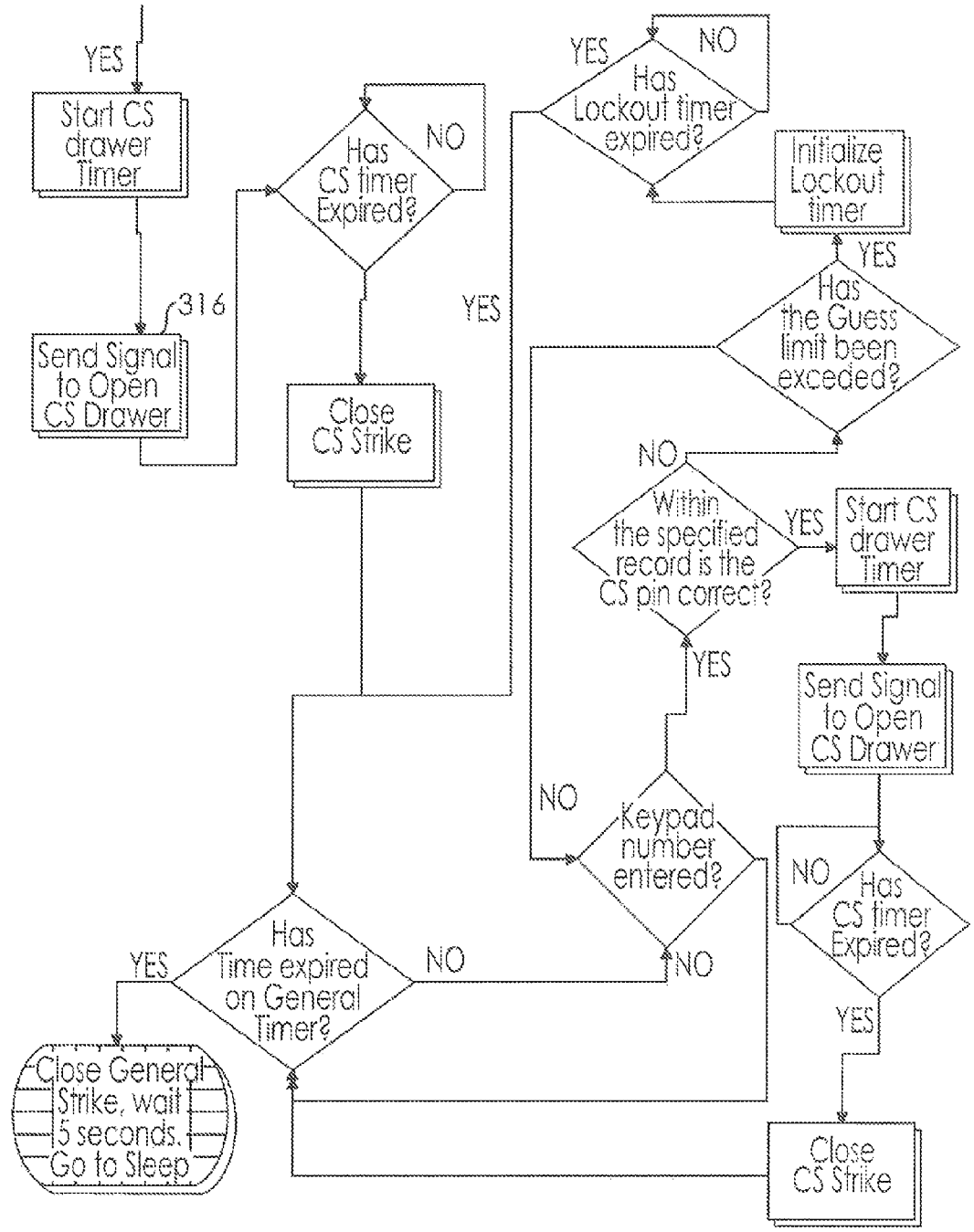

The operability of an embodiment of the wireless access control system disclosed herein when a remote access controller (107) is presented with a credential can be best understood in conjunction with the flow charts of FIGS. 3A-3C. As an overview, the wireless access control system generally utilizes decentralized authentication at each remote access controller (107) and the wireless network (103) often operates in a "sleep" mode to conserve the resources and power of the system.

Referring to FIGS. 3A, 3B and 3C, the operability of the wireless access control system with an interlocking cascade locking mechanism is shown when a credential is presented to the access request receiving device (109) at a first remote access controller (107) in the system. The presentation of a credential to the access request receiving device (109) "wakes" the first remote access controller (107) out of its "sleep" mode (301). At this time, the remote access controller (107) checks to see if a flag is present either in the remote wireless communicator (108), a node in the wireless network, the remote processor (110) or the remote storage device (111) (302).

If a flag is present (303), the remote access controller (107) sends a signal to the central server (104) for the date, time and access credentials for the individual(s) that have recently been removed from the central access database (304). Once the remote access controller (107) receives the flagged credential(s), it checks to see if the flagged credentials are present in its localized database (305). If the flagged credential(s) are present in the localized access database, they are deleted (306).

Once the ER check is complete, if a physical credential is being used, the remote processor (110) determines whether the physical credential is a credential card or a manual update card (307). If the card is a manual update card, the remote access processor (110) will go into an update routine (311). If the card is a credential card, then the remote processor (110) will enter into a comparing step to determine whether the presented credential is in the localized access database (308).

Once the ER check is complete, if a command input is being used, the processor (110) determines whether the command input is an access credential code or a maintenance update code (309). If the code is a maintenance update code, then the remote access processor (110) will go into a maintenance routine (310). If the card is a credential card, then the remote processor (110) will enter into a comparing step to determine whether the presented credential is in the localized access database (308).

In the comparing step (308), if the credential is found in the localized access database (312), then a command will be sent to open the locking mechanism (113) associated with the first remote access controller (107) (313). When a input command is entered into the second remote access controller (107), the second remote access controller (107) will determine whether the input command entered is interlinked to the same user as the credential that was presented to open the first remote access controller (107) (315). If the input command entered belongs to the same user, then the locking mechanism (113) associated with the second remote access controller (107) is opened (316).

In the comparing step (308), if the credential is not found in the localized access database (317), then a remote call is sent to the central access system (101) to determine if the localized database is current and if the credential is located in the central access database (318). If it is determined either that the central database has not been changed since the last periodic update to the localized database and/or that the credential presented is not a new addition to the centralized access database, then a signal will be sent to the remote access controller (107) to deny access (319). If it is determined that the credential represents a newly added credential to the central access database, then a command will be send to open the locking mechanism (113) associated with the first remote access controller (107) (321). When an input command is entered into the second remote access controller (107), the second remote access controller (107) will determine whether the input command entered is interlinked to the same user as the credential that was presented to open the first remote access controller (107) (315). If the input command entered belongs to the same user, then the locking mechanism (113) associated with the second remote access controller (107) is opened (316).

In each of the steps associated with an unlocking of a locking mechanism, a lockout timer can be engaged which will disable access to the secured area associated with the remote access controller (107) after a defined period of time.

It is also contemplated that the in each of the steps associated with the unlocking of a locking mechanism (113), there can be a limit to the number of attempted tries an individual has before the system locks-out. Once a locking mechanism (113) is closed, a lockout timer runs out, or a system lock-out is initiated by the input if too many incorrect codes, the remote access controller (107) will return to sleep mode.

Through the use of wireless radio frequency technology, the present wireless access system can also perform user data updates, audit trail histories, and remote sensing of various sensors, including but not limited to micro-switches, contact switches, temperature sensors, humidity, light, smoke/obscuration monitors, and gas sensors (i.e., carbon monoxide). In this way the remote access controller (107) need not only restrict access to the area, but may also monitor the area for any potentially damaging changes in environmental or other factors and can provide additional information related to securing the area such as records of what credentials were used for access and when such access occurred.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. An interlinked cascade wireless access control system, the interlinked cascade wireless access control system comprising:
   a central wireless access system;
   a remote wireless access system, the remote wireless access system being comprised of a plurality of remote access controllers located at access points; and
   a wireless network connecting the central wireless access system to the remote wireless access system;
   wherein an individual access point contains a first remote access controller representing a first level of security and at least one additional remote access controller representing a second level of security;
   wherein the first remote access controller must be disengaged by a first credential associated with a specific user before said specific user has access to a first space and before the at least one additional remote access controller can be disengaged; and
   wherein the at least one additional remote access controller will not be disengaged to allow said specific user to access a second space unless a second credential presented to the at least one additional remote access controller also belongs to said specific user and said specific user is the last user to access said first space.

2. The interlinked cascade wireless access control system of claim 1, wherein the at least one additional remote access controller is physically located within said first space.

3. The interlinked cascade wireless access control system of claim 1, wherein the interlinked cascade wireless access control system is utilized in a hospital setting.

4. The interlinked cascade wireless access control system of claim 3, wherein the access point is a controlled substances cart.

5. The interlinked cascade wireless access control system of claim 1, wherein the first remote access controller and the at least one additional remote access controller are disengaged sequentially.

6. The interlinked cascade wireless access control system of claim 1, wherein the first credential is a physical credential and the second credential is an access code.

7. The interlinked cascade wireless access control system of claim 1:
   wherein the first remote access controller will send a signal representative of the first credential to the central wireless access system after the first remote access controller is disengaged;
   wherein the at least one additional remote access controller sends a signal to the central wireless access system after the second credential is presented;
   wherein the central wireless access system determines whether the second credential belongs to said specific user;
   wherein the central wireless access system sends a signal to the at least one additional remote access controller instructing it to disengage if the second credential is valid and belongs to said specific user; and
   wherein the central wireless access system sends a signal to the at least one additional remote access controller instructing it to remain locked if the second credential is invalid or if the second credential does not belong to said specific user.

8. The interlinked cascade wireless access control system of claim 1, the system being further comprised of:
   a timing mechanism preset for a determined period of time;
   wherein the disengagement of the first remote access controller starts the timing mechanism; and
   wherein the system will lock-up if the at least one additional remote access controller is not disengaged prior to the expiration of the timing mechanism.

9. The interlinked cascade wireless access control system of claim 1, wherein the system is further comprised of a plurality of deeper levels of security.

10. The interlinked cascade wireless access control system of claim 4 wherein said first space is an interior of said cart and said second space is the interior of a compartment within said interior of said cart.

11. The interlinked cascade wireless access control system of claim 10 wherein controlled substances are stored in said second space and not in said first space.

12. The interlinked cascade wireless access control system of claim 10 wherein said controlled substances comprise narcotics.

13. The interlinked cascade wireless access control system of claim 1 wherein said first space is a room.

14. The interlinked cascade wireless access control system of claim 1 wherein said first space is an interior of a cabinet.

15. The interlinked cascade wireless access control system of claim 1:
   wherein the at least one additional remote access controller sends a signal to the first access controller after the second credential is presented;
   wherein the first access controller determines whether the second credential belongs to said specific user;
   wherein the first access controller sends a signal to the at least one additional remote access controller instructing it to disengage if the second credential is valid and belongs to said specific user; and
   wherein the first access controller sends a signal to the at least one additional remote access controller instructing it to remain locked if the second credential is invalid or if the second credential does not belong to said specific user.

16. The interlinked cascade wireless access control system of claim 8, wherein after lock-up occurs, the first remote access controller must first be reengaged and then again disengaged by the specific user using the first credential before the at least one additional remote access controller can be disengaged by presenting the second credential.

* * * * *